United States Patent
Bestgen et al.

(10) Patent No.: US 7,991,763 B2
(45) Date of Patent: Aug. 2, 2011

(54) DATABASE QUERY OPTIMIZATION UTILIZING REMOTE STATISTICS COLLECTION

(75) Inventors: Robert Joseph Bestgen, Rochester, MN (US); Michael S. Faunce, Rochester, MN (US); Wei Hu, Rochester, MN (US); Shantan Kethireddy, Rochester, MN (US); Andrew Peter Passe, Rochester, MN (US); Ulrich Thiemann, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 459 days.

(21) Appl. No.: 11/735,133

(22) Filed: Apr. 13, 2007

(65) Prior Publication Data

US 2008/0256025 A1    Oct. 16, 2008

(51) Int. Cl.
*G06F 17/30* (2006.01)
(52) U.S. Cl. .......... 707/713; 707/610
(58) Field of Classification Search ....... 707/2, 999.002, 707/610, 713
See application file for complete search history.

(56) References Cited

U.S. PATENT DOCUMENTS

| | | | | |
|---|---|---|---|---|
| 6,766,318 B1* | 7/2004 | Guay et al. | | 707/688 |
| 6,957,435 B2* | 10/2005 | Armstrong et al. | | 718/104 |
| 7,155,428 B1* | 12/2006 | Brown et al. | | 1/1 |
| 2003/0065644 A1* | 4/2003 | Horman et al. | | 707/1 |
| 2003/0212668 A1* | 11/2003 | Hinshaw et al. | | 707/3 |
| 2004/0087300 A1* | 5/2004 | Lewis | | 455/412.2 |
| 2004/0243799 A1* | 12/2004 | Hacigumus et al. | | 713/150 |
| 2005/0028134 A1* | 2/2005 | Zane et al. | | 717/106 |
| 2005/0097078 A1 | 5/2005 | Lohman et al. | | 707/2 |
| 2005/0131878 A1* | 6/2005 | Chen et al. | | 707/3 |
| 2005/0131879 A1* | 6/2005 | Ghosh et al. | | 707/3 |
| 2005/0149505 A1* | 7/2005 | Bossman et al. | | 707/3 |
| 2005/0234900 A1* | 10/2005 | Bossman et al. | | 707/4 |
| 2005/0267877 A1* | 12/2005 | Chaudhuri et al. | | 707/3 |
| 2006/0059205 A1* | 3/2006 | Shah et al. | | 707/200 |
| 2006/0112093 A1* | 5/2006 | Lightstone et al. | | 707/5 |
| 2006/0195416 A1* | 8/2006 | Ewen et al. | | 707/2 |
| 2006/0218123 A1* | 9/2006 | Chowdhuri et al. | | 707/2 |
| 2006/0230016 A1* | 10/2006 | Cunningham et al. | | 707/2 |
| 2008/0133458 A1* | 6/2008 | Zabback et al. | | 707/2 |
| 2008/0162416 A1* | 7/2008 | Sinclair | | 707/2 |

OTHER PUBLICATIONS

Bonnet, Philippe et al., Partial Answers for Unavailable Data Sources (12 pages.).
Raman, Vijayshankar et al., Progressive Optimization in Action, 2004 (4 pages.).

* cited by examiner

*Primary Examiner* — Hung T Vy
*Assistant Examiner* — Phuong-Thao Cao
(74) *Attorney, Agent, or Firm* — Wood, Herron & Evans, LLP

(57) ABSTRACT

A method, apparatus and program product to optimize a database query. In a first system having a first dataspace, a query plan is generated for the database query. Remote statistics collection associated with the database query is initiated on a second system having a second dataspace. The remote statistics collection uses the second dataspace, which includes a current copy of at least a portion of the first dataspace on the first system. Database statistics are collected for the first system by analyzing the second dataspace and then communicating the collected database statistics to the first system for use in optimizing database queries executed by the first system.

23 Claims, 3 Drawing Sheets

DATABASE QUERY OPTIMIZATION UTILIZING REMOTE STATISTICS COLLECTION

CROSS REFERENCE TO RELATED APPLICATIONS

This invention is related to U.S. patent application Ser. No. 11/735,095, filed on Apr. 13, 2007, herewith by Robert Victor Downer et al., and entitled "Portable and Iterative Re-usable Suboptimization of Database Queries", which is herein incorporated by reference in its entirety.

FIELD OF THE INVENTION

The present invention generally relates to computers and data processing and, more particularly, to optimizing database queries.

BACKGROUND OF THE INVENTION

One of the most difficult aspects of database query optimization is the balancing act necessary to find the best strategy to run the query without taking too long to find it. A query optimizer is a component of a database management system that attempts to determine the most efficient way to execute a query. The output of an optimizer is typically referred to as a query plan or access plan, which is a form of executable code that can be processed by a database engine to execute the query. Many optimizers operate by selecting or generating multiple potential query plans for a given query, and selecting from the potential query plans an optimal query plan.

Cost-based query optimizers typically operate by assigning an estimated "cost" to each possible query plan, and then choosing the plan with the least cost. Costs are used to estimate the runtime cost of evaluating the query, in terms of the number of I/O operations required, the CPU requirements, and other factors.

A query optimizer internally has a number of strategies that it uses to generate the set of query plans examined. The strategies, such as join strategy, union strategy, index strategy, grouping strategy, ordering strategy, etc., may be called recursively, so a join strategy may call an ordering strategy for a leg which in turn may call an indexing strategy which may call another strategy. Each strategy examines the possible access paths (e.g. index scan, sequential scan) and join algorithms (e.g. sort-merge join, hash join, nested loops). Thus, the search space can become quite large depending on the complexity of the query.

Given enough time, a query optimizer should be able to find a best plan by evaluating all possible query plans. However, in many cases it is impossible, or at least inadvisable, to try all possibilities. Depending on the complexity of the query, the search space of query plans for the optimizer could be so large that the time required to optimize the query could potentially exceed that amount of time necessary for an unoptimized query to complete. Thus, the resultant increase in optimization time would be unacceptable for many customers. Therefore, it is often only possible to attempt a subset of the query plans available for a given query, which may result in the selection of a suboptimal plan. A goal is to accomplish as much optimization as possible in the shortest amount of time. This may result in a need to defer some of the optimization tasks.

Optimization consists of multiple steps including generating query plans, collecting statistics on the data related to the query plans, using the statistics to estimate resource costs of the plan, and selecting a plan with the optimum resource costs. One of the resource intensive tasks of the optimization is collecting the statistics. Statistical information for the data in the underlying database may relate to tables and their indices, objects in a schema, objects in a database, etc. While some statistics may be collected with relatively low overhead, other, more detailed statistics may require "deep" statistics collections that may require extensive amounts of resources. In many instances, however, the resource requirements for some deep statistics collections preclude their performance on production systems due to time and resource constraints. When collecting statistics for a query in a production environment, there is a need to look at the current CPU utilization, the resources available, and then try to do the statistics collection without unduly loading the system. If a full statistics collection will overly load the system, a partial statistics collection may be executed, deferring the remaining collection for later.

An example of an approach that often provides suboptimal plans as a result of this crunch for time and resource is a plan based on an indexing strategy. Indexing is an optimization technique that uses indices built over columns to provide quicker access to the necessary data. The indexing strategy problems that are caused by the rush to get through optimization are twofold. First, in order to use an index, the optimizer must be able to represent the query's predicates in such a way that it can most efficiently and properly match with the correct indices. To accomplish this, predicates are represented in their disjunctive normal form ("DNF"). Unfortunately, building the DNF for a set of predicates can be very time consuming, as the time needed for DNF creation rises dramatically as the number of predicates, as well as the complexity of the predicates involved, increases. Therefore, depending on the set of predicates involved, it is often far too time-consuming to consider, so the DNF conversion is not done, and the indexing strategy, in turn, cannot be attempted.

Second, even if the DNF is created, it is often the case that the optimizer is unable to try all possible index combinations. In most cases, the columns that are covered by each index do not match up perfectly with columns referenced by the queries. It is especially common to have an index, which covers only a subset of the columns referenced by the query. In such a case, it can be beneficial to use multiple indices together to provide access to all necessary columns. One of the most important jobs of an optimizer can be to find a plan with the best possible combination of indices to include all necessary columns. However, as the number of columns in a table and the number of indices over the table increase, the time taken to run this indexing strategy increases exponentially, so the optimizer must employ some strategy to minimize the time taken. Often, this strategy is generally to search through the plans containing the index combinations until one is found that is "good enough", which often simply means that all columns are covered, but not necessarily with the optimal combination.

Several strategies exist for solving the problem of optimization techniques taking too long. The primary strategy for handling situations in which optimization time may become overly time consuming, as with the indexing strategy above, is simply to find a plan that is "good enough", or sufficient to provide a reasonably well-behaved plan. In other words, the optimizer will work until it finds a plan that works, but won't necessarily continue searching for better performing plans. Unfortunately, with very large databases or complex queries, even a plan that is considered "good enough" may be far inferior to other plans, which are not even attempted.

Another strategy that is often employed is simply not to even try a technique if it is deemed to be too time-consuming for the given query. In the case above, the predicates are given a score based on the complexity of the predicates, the number of predicates, and how the predicates are combined. If the complexity score is too high, the optimizer does not even attempt to create a DNF, thus saving time, but possibly overlooking a number of strong plans. This creates the obvious problem of completely dismissing optimization techniques and potentially overlooking the best performing plans.

Still another strategy that is used is to save a plan for a given query and, if possible, reuse or expand on this plan in future runs of the same query. The problem with this is that it is only helpful for future runs of the exact same query. Even with minimal changes to the query, the optimizer will be forced to completely restart each optimization strategy. Another problem with this strategy is that the entire query plan is saved, rather than just the portions that are unfinished or can be expanded on. This requires extra space on the system and may cause optimization problems when saving and loading the cached plans.

SUMMARY OF THE INVENTION

The invention addresses these and other problems associated with the prior art by providing an apparatus, program product, and method that generate query plans for a database query on a local system and utilize remote resources to collect statistics and evaluate the plans to optimize the plan for the local system. This often enables other benefits, among these, the ability to leverage the data and processor power on a remote system to assist with query optimization on a local system.

Consistent with a first aspect of the invention, a method is provided for optimizing a database query in a first system having a first dataspace. In the method, a query plan is generated for the database query in the first system. In addition, remote statistics collection associated with the database query is initiated by the first system on a second system having a second dataspace. The second dataspace on the second system includes a current copy of at least a portion of the first dataspace on the first system, and the remote statistics collection uses the second dataspace.

In an embodiment of the first aspect, the query plan is optimized on the first system using the remote statistics collected on the second system. The query plan may be divided into first and second query subplans, where the first and second query subplans may be optimized separately. Remote statistics collection may be performed for the first query subplan on the second system while statistics collection for the second query subplan may be performed on the first system.

In another embodiment of the first aspect a change in data that is part of the database query is logged and reoptimization of a database query may be initiated on the second system. The database query on the first system may then be forced to use a new query plan or new statistics that is the result of the reoptimization of the database query on the second system.

Consistent with a second aspect of the invention, a method is provided for optimizing database queries configured to be executed in a first system, where the first system is of the type having a first dataspace. In a second system coupled to the first system, database statistics are collected for the first system by analyzing a second dataspace having a current copy of at least a portion of the first dataspace. Collected database statistics are then communicated to the first system for use in optimizing database queries executed by the first system.

In an embodiment of the second aspect, collected database statistics are stored in a plan cache, where the plan cache is available to the first system. The plan cache comprises a local plan cache on the first system, and optimization data in the local plan cache is synchronized with optimization data in a remote plan cache on the second system.

In another embodiment of the second aspect, objects of the first system in the first dataspace are correlated to objects of the second system in the second dataspace. Correlation may include correlating at least one database relation between the first and second dataspaces using a long name and a short name, although any number of correlation techniques may be used. Statistics collection associated with the database query is then performed using the second dataspace.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the principles of the invention.

DETAILED DESCRIPTION

Embodiments consistent with the invention may be configured to identify queries needing statistics collections, some needing deep statistics collections, and transfer this work to a remote system such as a High Availability solution, for example, potentially using a local and remote plan cache. Statistics collections are then performed on any remote system (or partition) with up-to-date copies of databases, a task that is often unfit for a production system. Deep statistics collection may also include statistics computations that do not require dataspace access such as predicate transformations. The deep statistics collection data may be gathered and query plans may be reoptimized on the remote system if the statistics used in the initial optimization have changed drastically. The communication between the local, production and the remote systems may be accomplished using a remote plan cache, for example. Statistics changes and plan changes may also be applied to the local plan cache and any local dataspace column statistics may then be updated. Statistics collections of any type, from simple to deep collections, may be performed on any remote system in communication with the local system. A remote system may be a system that is physically distinct and separate from the local system, it may be a node in a cluster of systems of which the local system is a part, or the local and remote systems may be logical systems or partitions that exist on the same physical hardware.

Figure 1:
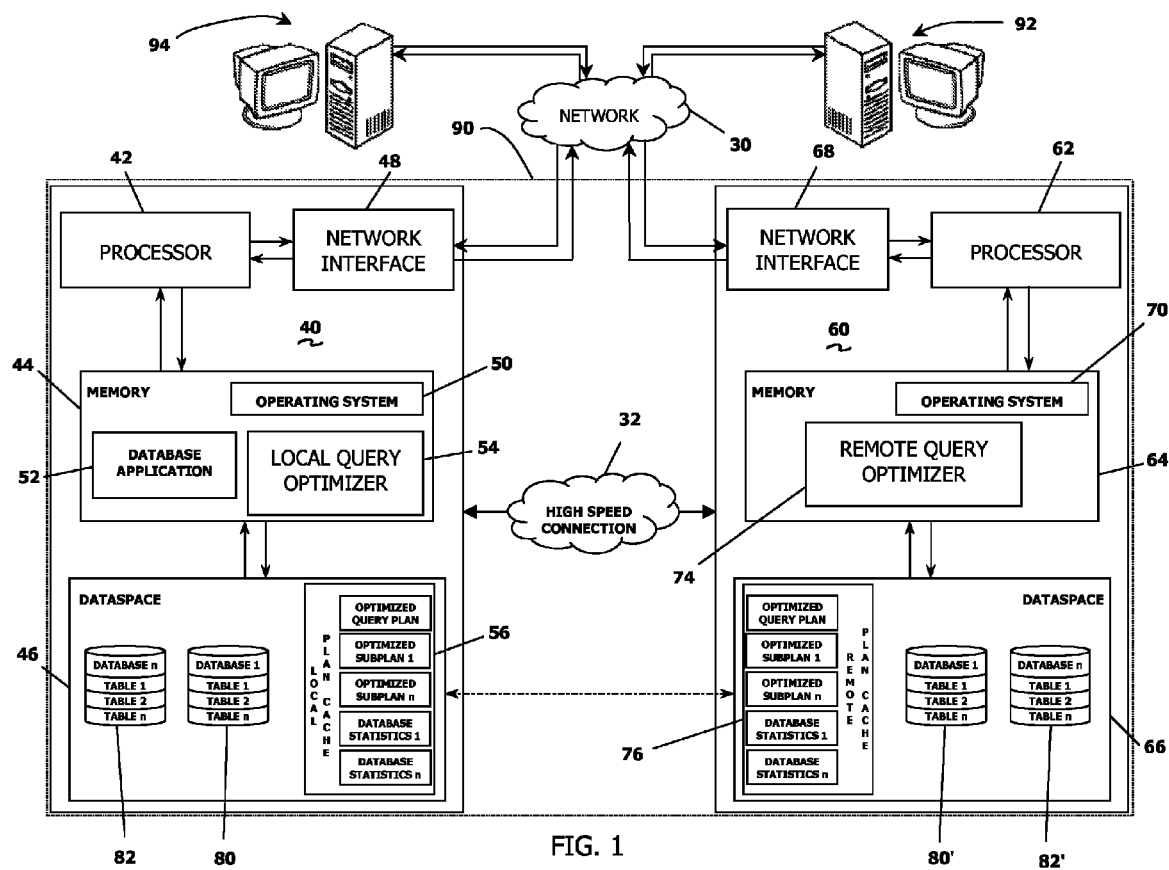
FIG. 1 is a block diagram of an exemplary hardware and software environment for a computer system suitable for implementing database equerry optimization consistent with the invention.

Turning to the drawings, wherein like numbers denote like parts throughout the several views, FIG. 1 illustrates an embodiment of the invention using a High Availability solution for disaster recovery. Data recovery is an important factor in any disaster recovery plan. One of the main challenges in disaster recovery is getting a copy of the latest data on the target system. Traditionally, this has been the domain of a High Availability provider. For reasons of data security and integrity not related to this invention, computer 40 may be used in a production environment as a local, production system and may communicate with a second, remote system 60, which may have the purpose of maintaining an identical copy of at least a portion of the dataspace found on the local system 40. These High Availability solutions often incorporate remote systems, such as system 60, that contain current copies of all data sources. But the data on the remote systems often sits idle where it could be leveraged for use with a query optimizer. Thus, consistent with an embodiment of the invention, high availability system 60 may be utilized for database query optimizations by shipping work from the local, production system 40, to the remote high availability system 60 to run statistics collection and optimization tasks.

Each of computers 40, 60 in the embodiment in FIG. 1 may include at least one processor 42, 62 coupled to a memory 44, 64. Processor 42, 62 may represent one or more processors (e.g. microprocessors), and memory 44, 64 may represent the random access memory (RAM) devices comprising the main storage of computers 40, 60, as well as any supplemental levels of memory, e.g., cache memories, non-volatile or backup memories (e.g. programmable or flash memories), read-only memories, etc. In addition, memory 44, 64 may be considered to include memory storage physically located elsewhere in computers 40, 60, e.g., any cache memory in a processor 42, 62, as well as any storage capacity used as a virtual memory, e.g., as stored on a mass storage device 46, 66.

Each computer 40, 60 also typically receives a number of inputs and outputs for communicating information externally. For interface with a user or operator, computers 40, 60 may include one or more user input devices (e.g., a keyboard, a mouse, a trackball, a joystick, a touchpad, a keypad, a stylus, and/or a microphone, among others). Each computer 40, 60 may also include a display (e.g., a CRT monitor, an LCD display panel, and/or a speaker, among others). The interface to computers 40, 60 may also be through an external terminal connected directly or remotely to computers 40, 60, or through another computer 92, 94 communicating with computers 40, 60 via a network 30, modem, or other type of communications device.

Each computer 40, 60 operates under the control of operating system 50, 70 and executes or otherwise relies upon various computer software applications, components, programs, objects, modules, data structures, etc. (e.g. database application 52 or query optimizers 54, 74). Moreover, various applications, components, programs, objects, modules, etc. may also execute on one or more processors in another computer coupled to computer 40, 60 via a network 30, e.g., in a distributed or client-server computing environment, whereby the processing required to implement the functions of a computer program may be allocated to multiple computers over a network 30.

In general, the routines executed to implement the embodiments of the invention, whether implemented as part of an operating system or a specific application, component, program, object, module or sequence of instructions will be referred to herein as "computer program code", or simply "program code". The computer program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable media used to actually carry out the distribution. Examples of computer readable media include but are not limited to physical, recordable-type media such as volatile and non-volatile memory devices, floppy and other removable disks, hard disk drives, optical disks (e.g., CD-ROM's, DVD's, etc.), among others, and transmission-type media such as digital and analog communication links.

In addition, various program code described hereinafter may be identified based upon the application or software component within which it is implemented in specific embodiments of the invention. However, it should be appreciated that any particular program nomenclature that follows is merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Those skilled in the art will recognize that the exemplary environment illustrated in FIG. 1 is not intended to limit the present invention. Indeed, those skilled in the art will recognize that other alternative hardware and/or software environments may be used without departing from the scope of the invention.

In some embodiments, remote system 60 may be any remote computer with resources available to perform database statistics collection. In other embodiments, the local system 40 and the remote system 60 may be separate logical partitions on the same computer hardware platform as disclosed in U.S. Pat. No. 6,957,435, which is herein incorporated by reference in its entirety. In alternate embodiments, and more commonly for disaster recovery purposes of a high availability system, local system 40 and remote system 60 may be independent computer hardware platforms communicating through a high-speed connection 32 or a network 30, as depicted in FIG. 1.

Due to the nature of the work performed by the remote system 60, there is typically little interaction between the system 60 and a user or operator. The interface to remote system 60 may typically be through another computer 40 communicating with remote system 60 via a high-speed connection 32, a network 30 or other type of communications device. Other than maintaining the current copy of the production dataspace 66, the processor 62 on remote system 60 may have idle time that could be utilized by other applications, such as a remote query optimizer 74.

The dataspace 46 on the local, production system 40 and the remote dataspace 66 on the remote system 60 may contain objects such as a local and remote plan cache 56, 76 and databases 80, 82 containing tables. The dataspace plan cache 56, 76 may also contain objects such as runtime statistics. In some embodiments, the local plan cache 56 may be used by the local query optimizer 54 to communicate with the remote query optimizer 74 by synchronizing with the remote plan cache 76. Local plan cache 56 may be used to store statistics and optimization data utilized by the local query optimizer 54. Objects in the local plan cache 56 may be marked for re-evaluation, which may be performed by the remote system 60 by the remote query optimizer 74. In other embodiments, other methods of communicating query optimization data between local system 40 and remote system 60 may be used.

Generally, database systems can be programmed to generate statistics on data stored in selected database columns. Database statistics typically include, but are not limited to the following: the time of the last statistics collection, the number of rows in the table in which the column is stored, the approximate number of pages occupied by the data stored in the column, the average length of the data stored in the column, the distribution of values in the column (i.e. a histogram), the densities of values in the column, and the cardinality or number of distinct values. Collecting these statistics for use by the query optimizer to predict query plan performance may be time consuming. As discussed above some statistics collection may be too time consuming to complete in the time and resources allocated for the local query optimizer 54 executing on local system 40, thereby being deferred to the remote system 60.

Figure 2:
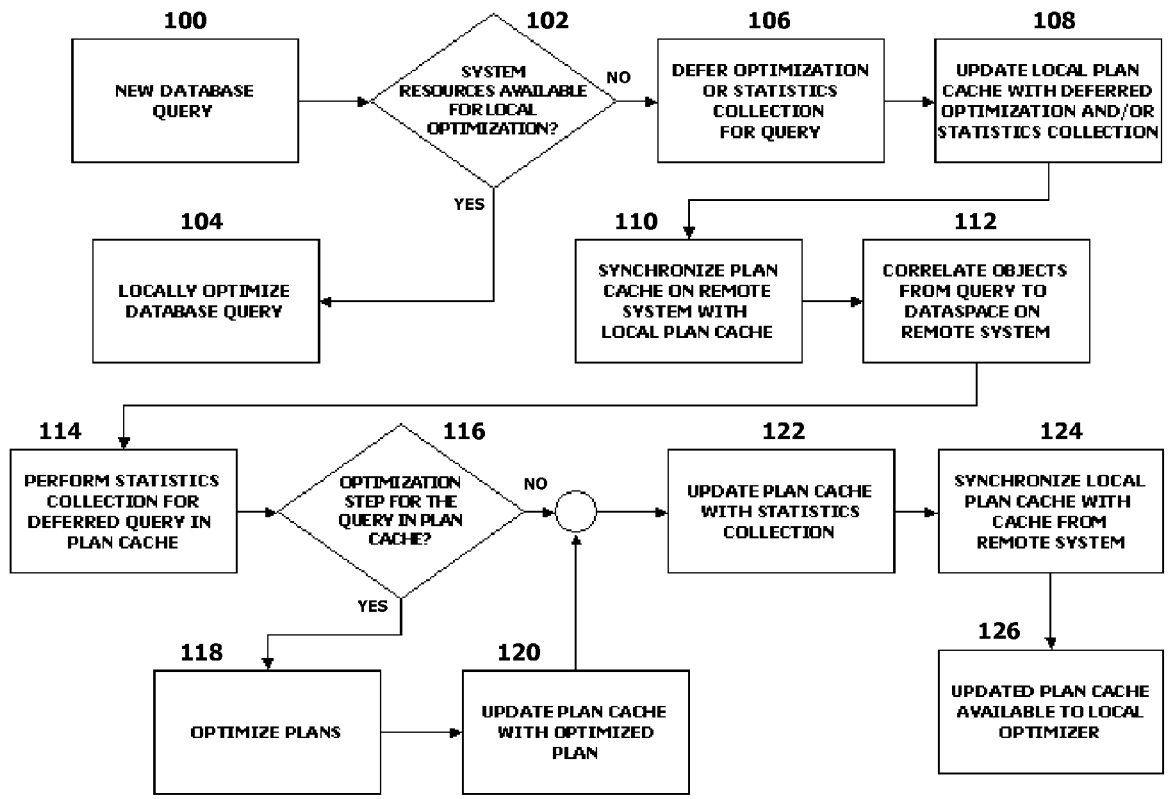
FIG. 2 is a flowchart of an exemplary process for deferring statistics collection and optimization to a remote high availability system consistent with the invention.

A method for deferring statistics collection and optimization from the local, production system 40 to the remote system 60 for some embodiments may be seen in FIG. 2. A new database query is received by a query optimizer in block 100. A check is made of the resources available to the query optimizer to see if the resources are sufficient to perform the statistics collection and optimization. If the resources are sufficient (yes branch of decision block 102) then the optimization is performed locally in block 104. If, however, there aren't sufficient resources (no branch of decision block 102) the optimization or the statistics collection may be deferred. In some embodiments, the entire optimization and statistics collection process may be deferred to the remote system. In other embodiments, only portions of the process may be deferred. For example, the statistics collections may be deferred to the remote system, while the production system continues to perform the optimizations, utilizing the statistics collected by the remote system.

In embodiments using a plan cache to communicate between the two systems, the local plan cache on the local, production system may be updated with the deferred optimization and/or statistics collection in block 108. The remote plan cache on the remote system is then synchronized with the local plan cache in block 110. Objects from the query are then correlated to the objects in the dataspace on the high availability system in block 112 using long names and short names. Long names and short names are means for identifying database relations. The relation, which consists of a set of tuples or ordered lists, can be referred to by an assigned long name, descriptive of the relation. The short name is a shortened derivation of the long name used as an additional reference for the relation. In other embodiments, any number of correlation techniques may be used. Once the objects have been correlated, statistics collection may be executed for any collections that were deferred by the production system in block 114. If an optimization was also deferred (yes branch of decision block 116), then the optimization may be performed on the remote system in block 118 and the remote plan cache updated accordingly in block 120. If there were no deferred optimizations (no branch of decision block 116) then the remote plan cache is updated with the results of the statistics collection in block 122.

At the completion of the statistics collection(s) and optimization(s) performed on the remote system, the local plan cache is synchronized with the remote plan cache in block 124. The updated plan cache is now available to the local optimizer for future optimizations. Advantages of the method over the prior art include the ability to identify statistic collections that have been deferred, ship those statistics collection requests to remote systems, perform that statistics collections on the remote system, reoptimize plans using updated statistics, and ship the changes back to the production system.

In some embodiments using a plan cache, structures of deferred statistics collections are maintained in the plan cache on a query-by-query bases. The plans may then be sorted by worst "estimate-to-runtime" delta. The top 'n' worst performers with deferred statistics collections may be shipped to a remote system and populate the remote plan cache with these queries. Other items in the plan cache may additionally include queries that were deferred based on rules or queries that were deferred because they require a deep statistics collection that would not be able to be performed on the production system. The relations with the underlying dataspaces may be correlated on the remote system using long names and short names or some other correlation method. The desired deep statistics collections may then be performed using a query time limit governor/storage limit governor to avoid situations such as never ending collections. If the resulting collection results in a value much different from the value used in the initial optimization, the referencing plan(s) may be reoptimized. The resulting optimization may then replace the original plan in the remote plan caches if it is different. After all 'n' statistics collections have been completed, the plan caches on the remote and production system may be synchronized to incorporate any statistics/plan changes.

In other embodiments, query plans may be divided into sub-optimizations or subplans. These subplans may be optimized individually and stored for future use by the query optimizer as disclosed in the aforementioned co-pending application. The sub-optimizations that are deferred may be shipped to the remote system for statistics collection and optimization.

Figure 3:
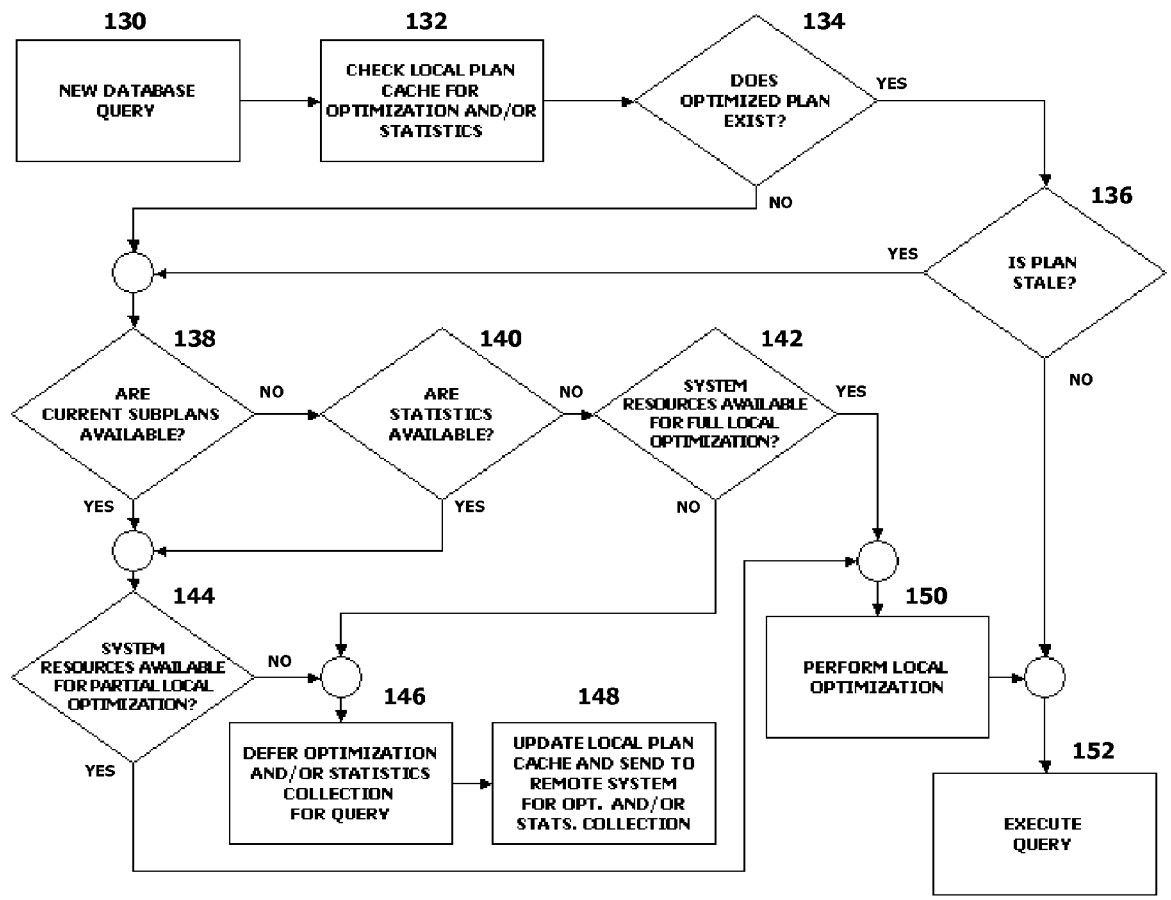
FIG. 3 is a flowchart of an exemplary process for determining stale optimization plans and statistics for possible reoptimization.

Optimized queries relying on stale statistics may be marked by the local query optimizer for a refresh. While in some embodiments this optimization aspect may be optional, any collected statistics may still be sent to the production system and updated in the plan cache. For embodiments with a reoptimization aspect, FIG. 3 shows a method for refreshing optimizations. A new request for a query is received by the query optimizer in block 130. A check is made in the local plan cache for optimization and/or statistics collected for the query in block 132. If an optimized plan does exist (yes branch of decision block 134) and that plan is not stale (no branch of decision block 136) then the query is executed according to the optimized plan in block 152.

If the optimized plan is stale (yes branch of decision block 136), meaning that there has been a change in the underlying statistics used to optimize the plan, then reoptimization of the query may be performed. In some embodiments, depending on the underlying data that is causing the plan to be stale, a partial reoptimization may be performed instead of a full optimization. If sub-optimizations or subplans are available that are not stale (yes branch of decision block 138) then a partial optimization path may be taken. If there are no sub-optimizations (no branch of decision block 138), but there are statistics available that do not need to be refreshed (yes branch of decision block 140), then an optimization reusing the statistics may be performed. If the underlying changes that made the plan stale are sufficient enough to force a complete reoptimization, then a check is made to see if there are sufficient resources for the optimization on the local, production system. If there aren't sufficient resources (no branch of decision block 142), then the optimization is deferred and sent to the remote system. If there are sufficient resources (yes branch of decision block 142) then the optimization may take place on the local, production system in block 150 and the query is executed utilizing the reoptimized plan in block 152.

If a partial reoptimization is to be performed, a check is made of the system resources to determine if there are sufficient resources to perform the optimization. If resources are available (yes branch of decision block 144) then the query is reoptimized in block 150 and the query is executed in block 152 using the reoptimized plan. If, however, resources are not available for a local optimization (no branch of decision block 144), then only those parts of the plan that are stale may be deferred and may be sent to the remote system in block 146. Any statistics or sub-optimizations that are not stale need not be re-evaluated. The local plan is updated and statistics collection and optimization are sent to the remote system in block 148. The refreshed items, such as statistics data may then be sent back to the local, production system with any additional required optimization occurring on the production system, utilizing the refreshed statistics from the remote system.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of applicants' general inventive concept.

What is claimed is:

1. A method for processing a database query, the method comprising, in a first system having a first dataspace including a database, in response to receiving a database query for the database:
   generating a query plan for the database query on the first system;
   determining whether to defer statistics collection for the database query on the first system; and
   in response to determining to defer statistics collection for the database query on the first system, initiating remote statistics collection associated with the database query on a second system having a second dataspace, wherein the second dataspace includes a copy of the database on the first dataspace on the first system, and wherein the remote statistics collection uses the copy of the database on the second dataspace,
   wherein the second system maintains the second dataspace as a live copy of the first dataspace.

2. The method of claim 1 further comprising:
   optimizing the query plan on the first system using remote statistics collected on the second system.

3. The method of claim 1 wherein generating the query plan comprises dividing the query plan into a first and second query subplan, wherein the first and second query subplans are optimized separately.

4. The method of claim 3 further comprising:
   performing remote statistics collection for the first query subplan on the second system; and
   performing statistics collection for the second query subplan on the first system.

5. The method of claim 1 further comprising:
   optimizing the query plan on the second system; and
   returning optimization data associated with the query plan to the first system.

6. The method of claim 5 wherein the optimization data is selected from the group consisting of statistics data for the query plan, progress data for partially optimized plans, costing data for query plans, and costing and statistics data for fully optimized plans.

7. The method of claim 1 further comprising:
   logging a change in data that is part of the database query; and
   initiating reoptimization of the database query on the second system.

8. The method of claim 7 wherein the database query on the first system is forced to use a new query plan or new statistics as a result of the reoptimization of the database query on the second system.

9. A method for optimizing database queries configured to be executed in a first system of a type having a first dataspace including a database, the method comprising, in a second system coupled to the first system:
   in response to a determination that statistics collection on the first system for a database query received by the first system is deferred, collecting database statistics for the first dataspace on the first system by analyzing a second dataspace having a copy of the database on the first dataspace; and
   communicating collected database statistics to the first system for use in optimizing the database query on the first system,
   wherein the second system maintains the second dataspace as a live copy of the first dataspace,
   wherein collecting the database statistics on the second system is responsive to a request from the first system, and
   wherein the request for collecting database statistics is made in response to a query optimizer on the first system deferring the statistics collection.

10. The method of claim 9 wherein communicating collected database statistics comprises storing collected database statistics in a plan cache, wherein the plan cache is available to the first system.

11. The method of claim 10 wherein the plan cache comprises a local plan cache on the first system, the method further comprising synchronizing optimization data in the local plan cache with optimization data in a remote plan cache on the second system.

12. The method of claim 11 wherein the optimization data is selected from the group consisting of statistics data for the query plan, progress data for partially optimized plans, costing data for query plans, and costing and statistics data for fully optimized plans.

13. The method of claim 9 wherein the first system is a production system.

14. The method of claim 9 wherein the second system is a backup system.

15. The method of claim 9 wherein the first and second systems comprise a high availability system.

16. The method of claim 9 wherein analyzing the second dataspace comprises:
correlating objects of the first system in the first dataspace to objects of the second system in the second dataspace; and
performing statistics collection associated with the database query.

17. The method of claim 16 wherein correlating objects comprises correlating at least one database relation between the first and second dataspaces using a long name and a short name.

18. An apparatus comprising:
a processor disposed in a first system having a first dataspace including a database; and
program code configured to be executed by the processor and in response to receiving a database query for the database, to process the database query by generating a query plan for the database query, determining whether to defer statistics collection for the database query on the first system, and in response to determining to defer statistics collection for the database query on the first system, initiating remote statistics collection associated with the database query on a second system having a second dataspace, wherein the second dataspace includes a copy of the database on the first dataspace on the first system, and wherein the remote statistics collection uses the copy of the database on the second dataspace, wherein the second system maintains the second dataspace as a live copy of the first dataspace.

19. The apparatus of claim 18 wherein the first system is a production system, and wherein the second system is a backup system.

20. The apparatus of claim 18 wherein the first and second systems comprise a high availability system.

21. The apparatus of claim 18 wherein the program code is configured to generate the query plan by dividing the query plan into a first and second query subplan, wherein the first and second query subplans are optimized separately, wherein the program code is first program code and is further configured to perform statistics collection for the second query subplan on the first system, the apparatus further comprising a second processor disposed in the second system, and second program code configured to be executed by the second processor to perform remote statistics collection for the first query subplan on the second system.

22. The apparatus of claim 18 wherein the program code is further configured to log a change in data that is part of the database query, and initiate reoptimization of a database query on the second system.

23. A program product, comprising:
a recordable-type medium; and
a program code resident on the recordable-type medium and configured to optimize a database query to be executed in a first system of a type having a first dataspace including a database, the program code further configured to, in a second system coupled to the first system, and in response to a determination that statistics collection on the first system for a database query received by the first system is deferred, collect database statistics for the first dataspace on the first system by analyzing a second dataspace having a copy of the database on the first dataspace, and communicate the collected database statistics to the first system for use in optimizing the database query on the first system, wherein the second system maintains the second dataspace as a live copy of the first dataspace, wherein the program code is configured to collect the database statistics on the second system responsive to a request from the first system, and wherein the request for collecting database statistics is made in response to a query optimizer on the first system deferring the statistics collection.

* * * * *